(12) United States Patent
Murakami et al.

(10) Patent No.: US 8,701,835 B2
(45) Date of Patent: Apr. 22, 2014

(54) LUBRICATING DEVICE

(75) Inventors: Akira Murakami, Gotenba (JP); Shuji Moriyama, Susono (JP); Daisuke Tomomatsu, Susono (JP); Daisuke Tokozakura, Susono (JP); Masafumi Yamamoto, Susonno (JP); Keisuke Ichige, Aichi-ken (JP); Masanori Iritani, Nagoya (JP); Hiroyuki Nishizawa, Tajimi (JP); Hideyuki Suzuki, Nisshin (JP); Yasusi Hirano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 275 days.

(21) Appl. No.: 13/255,560

(22) PCT Filed: Mar. 5, 2010

(86) PCT No.: PCT/IB2010/000457
§ 371 (c)(1),
(2), (4) Date: Oct. 4, 2011

(87) PCT Pub. No.: WO2010/103364
PCT Pub. Date: Sep. 16, 2010

(65) Prior Publication Data
US 2012/0024392 A1 Feb. 2, 2012

(30) Foreign Application Priority Data
Mar. 11, 2009 (JP) .................................. 2009-058139

(51) Int. Cl.
*F01M 11/08* (2006.01)

(52) U.S. Cl.
USPC ....................................................... 184/6.23

(58) Field of Classification Search
USPC ....................................................... 184/6.23
See application file for complete search history.

(56) References Cited

U.S. PATENT DOCUMENTS 2,322,463 A * 6/1943 McDonald ................... 184/6.23
2,385,522 A * 9/1945 Malott ......................... 184/6.23
(Continued)

FOREIGN PATENT DOCUMENTS

JP         4-381        1/1992
JP         7-301416     11/1995
(Continued)

OTHER PUBLICATIONS

International Search Report in International Application No. PCT/IB2010/000457; Mailing Date: Jun. 2, 2010.
(Continued)

*Primary Examiner* — William A Rivera
*Assistant Examiner* — Henry Liu
(74) *Attorney, Agent, or Firm* — Finnegan, Henderson, Farabow, Garrett & Dunner, LLP

(57) ABSTRACT

This lubricating device 1 is equipped with an oil pan 2 that stores therein lubricating oil, a micro bubble generator 4 that mixes the lubricating oil with air to produce micro bubbles and supplies the lubricating oil in the oil pan 2 with the micro bubbles, and an oil pump 3 that pressurizes the lubricating oil in the oil pan 2 to supply the micro bubble generator 4 therewith. Further, in this lubricating device 1, the micro bubble generator 4 has an air inlet portion 431 disposed inside the oil pan 2 at a predetermined position with respect to an oil surface height (oil level) of the lubricating oil in the oil pan 2.

4 Claims, 2 Drawing Sheets

WHEN MICRO BUBBLES ARE GENERATED

(56) References Cited

U.S. PATENT DOCUMENTS

| | | | | |
|---|---|---|---|---|
| 3,670,499 | A | * | 6/1972 | Tucholski .................. 60/464 |
| 2010/0043731 | A1 | * | 2/2010 | Ito et al. .................. 123/41.02 |

FOREIGN PATENT DOCUMENTS

| | | |
|---|---|---|
| JP | 2002-195016 | 7/2002 |
| JP | 2002-303112 | 10/2002 |
| JP | 2003-161362 | 6/2003 |
| JP | 2007-9900 | 1/2007 |
| JP | 2007-024011 | 2/2007 |
| WO | WO 2007/010685 A1 | 1/2007 |
| WO | WO 2009/050964 A1 | 4/2009 |

OTHER PUBLICATIONS

Written Opinion of the International Searching Authority in International Application No. PCT/IB2010/000457; Mailing Date: Jun. 2, 2010.

Applicant's Response to Written Opinion of the International Searching Authority (Nov. 26, 2010).

Written Opinion of the International Preliminary Examining Authority in International Application No. PCT/IB2010/000457; Mailing Date: Mar. 7, 2011.

Applicant's Response to Written Opinion of the International Preliminary Examining Authority (Apr. 29, 2011).

* cited by examiner

WHEN MICRO BUBBLES ARE GENERATED

WHEN MICRO BUBBLES ARE NOT GENERATED

LUBRICATING DEVICE

CROSS-REFERENCE TO RELATED APPLICATIONS

This application is a national phase application of International Application No. PCT/IB2010/000457, filed Mar. 5, 2010, and claims the priority of Japanese Application No. 2009-058139, filed Mar. 11, 2009, the contents of both of which are incorporated herein by reference.

BACKGROUND OF THE INVENTION

1. Field of the Invention

The invention relates to a lubricating device, and more specifically, to a lubricating device capable of appropriately performing oil level control by entraining micro bubbles into lubricating oil.

2. Description of the Related Art

A lubricating device faces the task of appropriately controlling the oil surface height (oil level) of lubricating oil in an oil pan. For example, a lubricating device applied to a transmission has a problem in that the stirring loss of lubricating oil increases when the oil level is too high, and conversely, another problem in that the required performance of lubrication cannot be ensured when the oil level is too low.

As a lubrication device according to the related art, there is known an art described in Japanese Patent Application Publication No. 2007-9900 (JP-A-2007-9900). This lubricating device is equipped with a micro bubble generator that mixes lubricating oil with air to produce micro bubbles. By entraining micro bubbles into lubricating oil, the lubricating device increases the apparent volume of lubricating oil to adjust the oil level.

SUMMARY OF THE INVENTION

The invention provides a lubricating device capable of appropriately performing oil level control by entraining micro bubbles into lubricating oil.

A first aspect of the invention relates to a lubricating device equipped with a vessel that stores therein lubricating oil, and a micro bubble generator for mixing the lubricating oil with air to produce micro bubbles within the oil and supplying the micro bubbles and the oil to the vessel. In this lubricating device, the micro bubble generator has an air inlet portion disposed inside the vessel at a predetermined height with respect to the oil surface. In this lubricating device, the air inlet portion of the micro bubble generator is disposed inside the vessel at the predetermined position with respect to the oil surface height (oil level) of the lubricating oil. According to this construction, the oil level vertically fluctuates to make the air inlet portion visible or invisible from the oil surface of the lubricating oil. In other words, the air inlet portion is exposed or unexposed from the oil surface. The lubricating oil is thereby intermittently supplied with the micro bubbles. Thus, the oil level is held at the predetermined position (at a height where the air inlet portion is installed). Therefore, the lubricating device is advantageous in that oil level control is appropriately performed without sensing the oil surface level and/or controlling the amount of the air to be supplied.

Further, the air inlet portion is preferably disposed at a position substantially identical to an optimal value of the oil surface height of the lubricating oil stored in the vessel. According to this construction, the oil level is controlled to the optimal value. Thus, the lubricating device is advantageous in that the oil level can be appropriately optimized.

Further, the amount of the lubricating oil stored in the vessel may be set such that the oil surface height of the lubricating oil is lower than the air inlet portion during stoppage of the micro bubble generator and can reach the air inlet portion during operation of the micro bubble generator. According to this construction, the amount of the lubricating oil is prevented from becoming excessive or deficient. Therefore, the lubricating device is advantageous in that oil level control is appropriately performed during operation of the micro bubble generator.

In the lubricating device described above, the micro bubble generator preferably has an air outlet portion. And the air inlet portion and the air outlet portion may be positioned at different levels with respect to the surface level of the oil. Further the air inlet portion may be positioned higher than the air outlet portion. According to this structure, the air inlet portion and the air outlet portion are disposed at the different levels with respect to the oil surface level inside the vessel. If the air inlet portion exposes from the lubricating oil, the air outlet portion still positioned under the surface of the oil. In other words, the oil surface of the lubricating oil is set between the air inlet portion and the air outlet portion in vertical direction inside the vessel.

In the lubricating device described above, the micro bubble generator preferably has a main body portion in which micro bubbles are produced by mixing the air and the oil, and said body is disposed in an immersive manner in the lubricating oil. According to this construction, not only the inlet portion but also the main body portion of the micro bubble generator are disposed inside the vessel and the main body portion is immersed in the oil. The lubricating device is advantageous in that the micro bubbles can be supplied to the lubricating oil directly and does not require a pipe to make connection between the micro bubble generator and the vessel. Therefore, the lubricating device can have a simple construction.

The lubricating device described above, the vessel is preferably an oil pan.

A vehicular lubricating system comprising the lubricating device described above is preferably a transmission lubricating system and/or an internal combustion engine lubricating system.

Further the vehicular lubricating system preferably comprises an oil pump that supplies the lubricating oil to a target object and is driven by the engine torque. In the vehicular lubricating system, the micro bubble generator has a lubricating oil introduction portion connected to the oil pump. According to this structure, the oil pump can be used for supplying the lubricating oil to a target object as well as for generating the micro bubbles. The lubricating oil is pressurized by the oil pump and supplied to the micro bubble generator, and the swirl of the lubricating oil is thereby formed in the micro bubble generator. The negative pressure resulting from this swirl of the lubricating oil is used to suck in air from the air inlet portion into the micro bubble generator (the self-supply of air). Accordingly, this construction does not necessitate an air pump for supplying air to the micro bubble generator, and hence can reduce the cost of the device and save the space thereof.

A method for treating of lubricating oil comprises a step of mixing the lubricating oil with an air to produce micro bubbles within the oil, wherein the air is introduced from a position at a predetermined height with respect to the oil surface. According to this method, the oil level is held at the predetermined position at a height where the air is introduced.

Therefore, the lubricating device is advantageous in that oil level control is appropriately performed.

BRIEF DESCRIPTION OF THE DRAWINGS

The foregoing and further features and advantages of the invention will become apparent from the following description of an example embodiment with reference to the accompanying drawings, wherein like numerals are used to represent like elements, and wherein.

DETAILED DESCRIPTION OF THE EMBODIMENTS

The embodiment of the invention will be described hereinafter with reference to the drawings. It should be noted that the invention is not limited by this embodiment thereof. Further, this embodiment of the invention includes those components which can be replaced and are obviously replaceable while maintaining the identity of the invention. Further, a plurality of modification examples described in this embodiment of the invention can be arbitrarily combined with one another as long as this combination is obvious to those skilled in the art.

A lubricating device 1 is a device that lubricates a target object by supplying lubricating oil (oil) thereto, and is applied to, for example, a vehicular engine or a vehicular drive mechanism. In this embodiment of the invention, a case where the lubricating device 1 is applied to a vehicular transmission 10 will be described.

Figure 1:
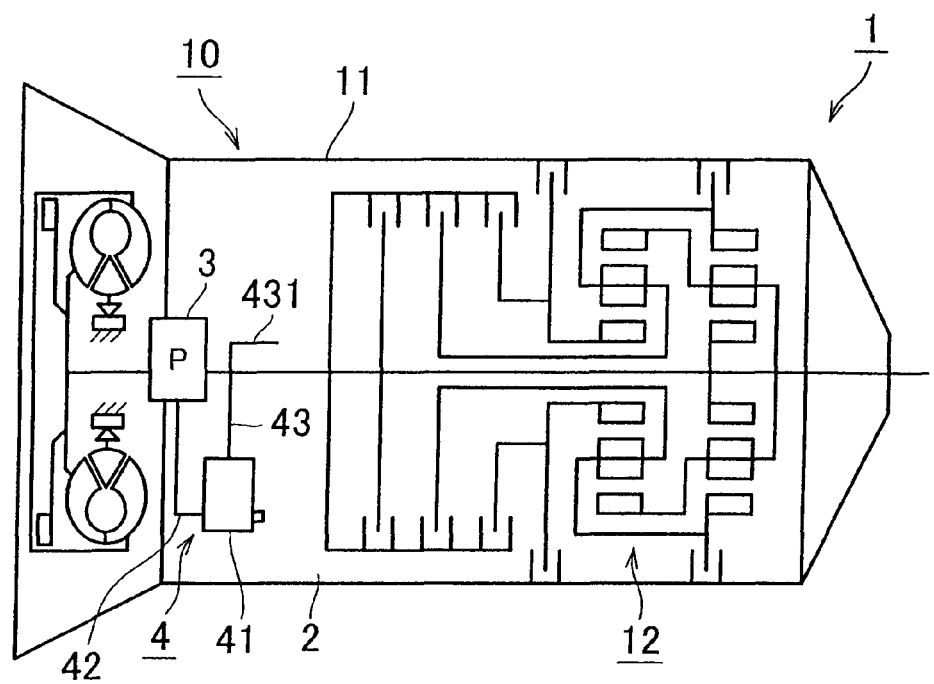
FIG. 1 is a constructional view showing a lubricating device according to the embodiment of the invention.

The lubricating device 1 is equipped with an oil pan 2, an oil pump 3, and a micro bubble generator 4, and is disposed in the transmission 10 (see FIG. 1). The oil pan 2 is an element that stores therein lubricating oil (a lubricating oil vessel). In this embodiment of the invention, the oil pan 2 is disposed in a bottom portion in a casing 11 of the transmission 10. The lubricating oil stored in this oil pan 2 is then raked up by a planetary gear 12 to lubricate the transmission 10. The oil pump 3, which is a pump for pressurizing lubricating oil, pressurizes the lubricating in the oil pan 2 and supplies the micro bubble generator 4 therewith. In this embodiment of the invention, the oil pump 3 is commonly employed for an engine (not shown) and supplies lubricating oil to a group of cams (not shown) of the engine as well. Further, the oil pump 3 is coupled to a drive shaft of a vehicle, and is driven by the power obtained from rotation of this drive shaft.

Figure 4:
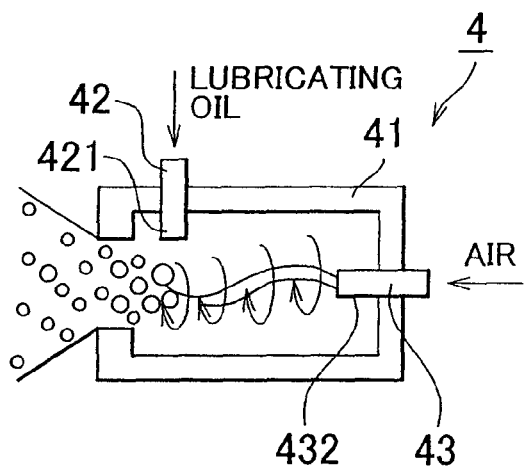
FIG. 4 is an illustrative view showing a common micro bubble generator.

The micro bubble generator 4 is a device that mixes lubricating oil with air to generate micro bubbles. This micro bubble generator 4 has a main body portion 41, a lubricating oil introduction portion 42, and an air introduction portion 43 (see FIG. 4). The main body portion 41 is designed as a tubular member assuming a generally cylindrical shape, and is disposed in an immersive manner in the lubricating oil in the oil pan 2. The lubricating oil introduction portion 42 is a pipeline for connecting the oil pump 3 to the main body portion 41, and serves as a passage for introducing into the main body portion 41 the lubricating oil pressurized by the oil pump 3. Further, a lubricating oil spurt port 421 of the lubricating oil introduction portion 42 is disposed along an inner peripheral face of the main body portion 41. The air introduction portion 43 is a pipeline drawn out from the main body portion 41, and serves as a passage for introducing air into the main body portion 41. Further, an air inlet portion (air supply port) 431 of the air introduction portion 43 is disposed at a predetermined position in the oil pan 2. The disposition of this air inlet portion 431 will be described later. Further, an air outlet portion 432 is disposed in the main body portion 41. This air outlet portion 432 is oriented in an axial direction of the main body portion 41 from one end of the main body portion 41. In this micro bubble generator 4, pressurized lubricating oil is spurted from the spurt port 421 of the lubricating oil introduction portion 42 into the main body portion 41, and a swirl of lubricating oil is formed in the main body portion 41. A negative pressure is then formed in the main body portion 41 due to this swirl, and air is axially sucked in from one end of the main body portion 41. This air is then rotated/sheared by the swirl of lubricating oil, and is thereby mixed with the lubricating oil to generate micro bubbles. These micro bubbles are then discharged from the other end of the main body portion 41 to the oil pan 2. It should be noted that the micro bubble generator 4 is not limited to the aforementioned construction but may adopt a known construction.

Figure 2:
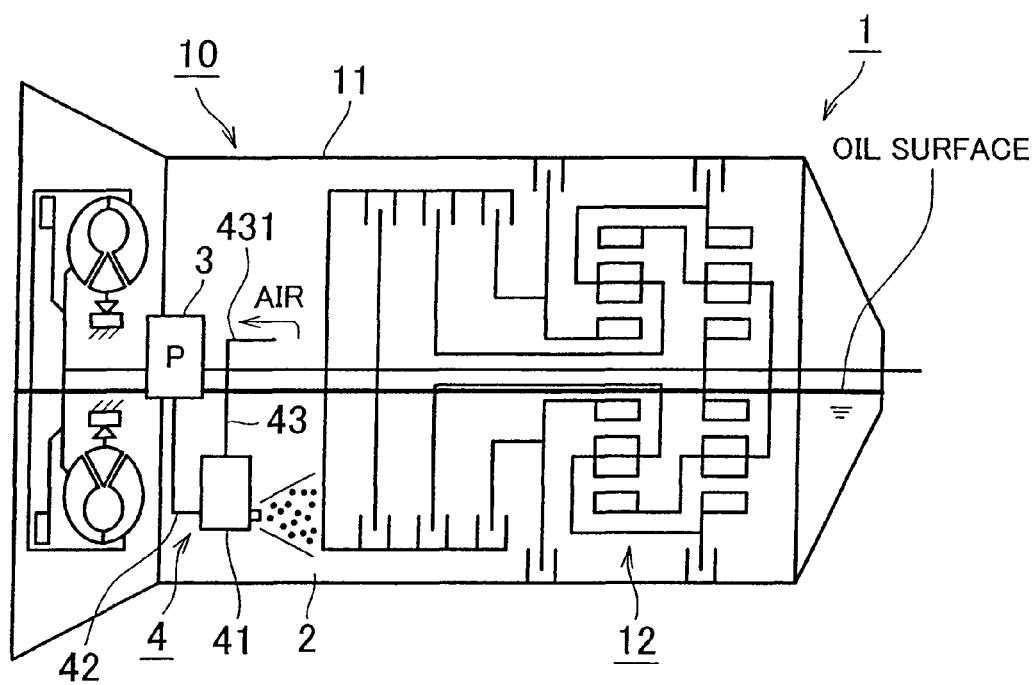
FIG. 2 is an illustrative view showing the operation of the lubricating device shown in FIG. 1.

In this lubricating device 1, the lubricating oil pressurized by the oil pump 3 and the air taken in from inside the oil pan 2 are mixed with each other in the micro bubble generator 4, and micro bubbles are generated (see FIG. 2). These micro bubbles are then entrained into the lubricating oil in the oil pan 2, and the apparent volume of the lubricating oil thereby increases. Thus, the oil surface height of the lubricating oil in the oil pan 2 rises to ensure a required oil level.

Figure 3:
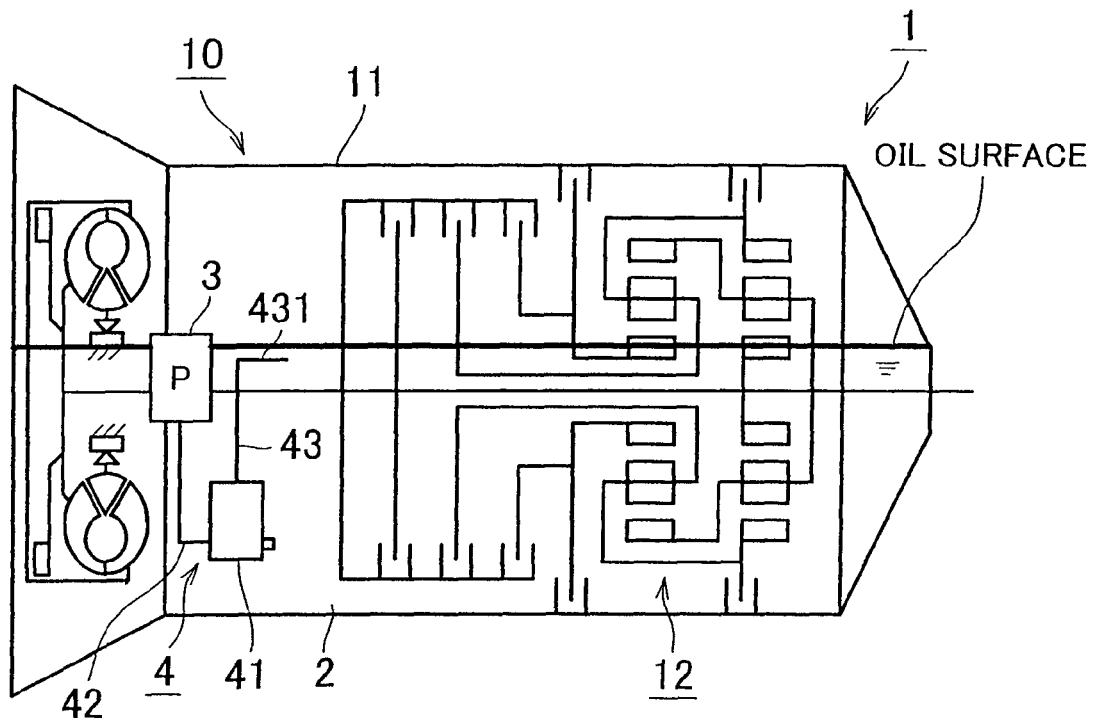
FIG. 3 is an illustrative view showing the operation of the lubricating device shown in FIG. 1.

It should be noted herein that the lubricating device 1 has the following construction to perform oil level control for the lubricating oil (see FIGS. 2 and 3). First of all, the air inlet portion 431 of the micro bubble generator 4 is disposed inside the oil pan 2 at a predetermined position with respect to the oil surface height (oil level) of the lubricating oil in the oil pan 2. For example, in this embodiment of the invention, the air introduction portion 43 is designed as a generally L-shaped tubular portion. One end of the air introduction portion 43 is connected to the main body portion 41 to serve as an air outlet portion 432, and the other end (rectilinear portion) of the air introduction portion 43 is disposed substantially horizontally with respect to the oil surface of the lubricating oil to serve as an air inlet portion 431. Further, in this case; the air inlet portion 431 is disposed at a position substantially identical to an optimal value of the oil level. The optimal value of the oil level is appropriately prescribed in accordance with, for example, a relationship between the stirring loss of the lubricating oil and the required performance of lubrication. Further, the amount of the lubricating oil is set such that the oil level is lower than the air inlet portion 431 during stoppage of the micro bubble generator 4 and can reach the air inlet portion 431 during operation of the micro bubble generator 4. That is, the oil amount of the lubricating oil is set such that the oil level is at a position lower than the optimal value (the position of the air inlet portion 431) during stoppage of the micro bubble generator 4 (during stoppage of the engine) and can reach the optimal value after having risen during operation of the micro bubble generator 4 (during operation of the engine).

In this lubricating device 1, first of all, the oil level in the oil pan 2 is at the position lower than the air inlet portion 431 during stoppage of the micro bubble generator 4. Accordingly, the air inlet portion 431 is in the air (above the oil surface of the lubricating oil), and hence the air can be supplied to the main body portion 41. Subsequently, when the micro bubble generator 4 operates due to the startup of the engine, micro bubbles are generated and entrained into the lubricating oil in the oil pan 2 (see FIG. 2). Thus, the oil level rises, and the required oil level is ensured. Subsequently, when the oil level rises to a predetermined position, the air inlet portion 431 is immersed in the lubricating oil, and the air is stopped from being supplied to the main body portion 41 (see FIG. 3). The supply of micro bubbles is then suspended, and the oil level falls. Then, when the oil level falls to a predetermined position, the air inlet portion 431 appears in the air from inside the lubricating oil, the air is supplied into the main body portion 41, and the supply of micro bubbles is resumed. Accordingly, the oil level vertically fluctuates to make the air inlet portion 431 visible or invisible from the lubricating oil surface, and micro bubbles are thereby intermittently supplied. Thus, the oil level is held at the predetermined position (at a height where the air inlet portion 431 is installed). Further, when the air inlet portion 431 is disposed at the position substantially identical to the optimal value of the oil level, automatic control is performed to optimize the oil level.

As described above, in this lubricating device 1, the air inlet portion 431 of the micro bubble generator 4 is disposed inside the oil pan 2 at the predetermined position with respect to the oil surface height (oil level) of the lubricating oil (see FIGS. 2 and 3). In this construction, the oil level vertically fluctuates to make the air inlet portion 431 visible or invisible from the lubricating oil surface, and the lubricating oil is thereby intermittently supplied with micro bubbles. Thus, the oil level is held at the predetermined position (at the height where the air inlet portion 431 is installed). Therefore, oil level control can be appropriately performed.

Further, in this construction, for example, the oil level can be adjusted more simply and at lower cost than in a construction (not shown) having an oil surface sensor for detecting an oil surface height of lubricating oil and an air amount adjustment mechanism for adjusting an amount of air to be supplied. Further, in this construction, oil level control demonstrates more robustness than in a construction (not shown) in which the oil level is controlled in accordance with, for example, an angle of inclination of a vehicle body, an oil temperature, an input rotational speed or the like.

Further, in this construction, the oil level can be raised through the supply of micro bubbles. Therefore, the amount of the lubricating oil in the oil pan 2 can be reduced. Thus, there is an advantage in that the oil pan 2 can be reduced in size, and the device can be reduced in weight. Further, an improvement in warm-up performance can be made during operation in a cold state.

Further, in this lubricating device 1, the air inlet portion 431 is disposed at the position substantially identical to the optimal value of the oil level. Therefore, the oil level is controlled to the optimal value. Thus, the oil level can be appropriately optimized.

Further, in this lubricating device 1, the amount of the lubricating oil is set such that the oil surface height of the lubricating oil stored in the oil pan 2 is lower than the air inlet portion 431 during stoppage of the micro bubble generator 4 and can reach the air inlet portion 431 during operation of the micro bubble generator 4. In this construction, the lubricating oil is prevented from becoming excessive or deficient. Therefore, oil level control can be appropriately performed during operation of the micro bubble generator 4. For example, in a construction in which the oil surface height of the lubricating oil is higher than the air inlet portion during stoppage of the micro bubble generator or cannot reach the air inlet portion during operation of the micro bubble generator, the supply of air to the micro bubble generator is not adjusted. Therefore, oil level control may not be appropriately performed.

In this embodiment of the invention, the lubricating oil is pressurized by the oil pump 3 and supplied to the main body portion 41, and the swirl of the lubricating oil is thereby formed in the main body portion 41. The negative pressure resulting from this swirl of the lubricating oil is used to suck in air from the air inlet portion 431 into the main body portion 41 (the self-supply of air). Accordingly, this construction does not necessitate an air pump for supplying air to the main body portion 41, and hence can reduce the cost of the device and save the space thereof. However, the invention is not limited to this construction. The air may be supplied to the main body portion using the air pump (not shown).

As described above, the lubricating device according to the invention is advantageous in that oil level control can be appropriately performed by entraining micro bubbles into lubricating oil.

The invention claimed is:

1. A lubricating device comprising:
    an oil pan that stores therein lubricating oil; and
    a micro bubble generator that mixes the lubricating oil with air to produce micro bubbles within the oil and supplies the micro bubbles and the oil to the oil pan, wherein
    the micro bubble generator has an air inlet portion disposed inside the oil pan at a predetermined position with respect to an oil surface height,
    the predetermined position is a position substantially identical to an optimal value of the oil surface height of the lubricating oil stored in the oil pan, and
    the amount of the lubricating oil stored in the oil pan is set such that the oil surface height of the lubricating oil is lower than the air inlet portion during stoppage of the micro bubble generator and reaches the air inlet portion during operation of the micro bubble generator.

2. The lubricating device according to claim 1, wherein the micro bubble generator has an air outlet portion, and
    the air inlet portion and the air outlet portion are disposed at different positions with respect to the oil surface height.

3. The lubricating device according to claim 2, wherein the air inlet portion is positioned higher than the air outlet portion.

4. The lubricating device according to claim 1, wherein the micro bubble generator has a main body portion in which micro bubbles are produced by mixing the air and the oil, and said main body portion being disposed in an immersive manner in the lubricating oil.

* * * * *